US010643566B2

(12) United States Patent
Kim

(10) Patent No.: US 10,643,566 B2
(45) Date of Patent: May 5, 2020

(54) DISPLAY DEVICE

(71) Applicant: Samsung Display Co., Ltd., Yongin-Si, Gyeonggi-Do (KR)

(72) Inventor: Yeoncu Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/135,311

(22) Filed: Sep. 19, 2018

(65) Prior Publication Data

US 2019/0108811 A1 Apr. 11, 2019

(30) Foreign Application Priority Data

Oct. 10, 2017 (KR) .................. 10-2017-0129121

(51) Int. Cl.
*G09G 3/36* (2006.01)
*G02F 1/1362* (2006.01)
*G09G 3/20* (2006.01)

(52) U.S. Cl.
CPC ..... *G09G 3/3688* (2013.01); *G02F 1/136213* (2013.01); *G02F 1/136286* (2013.01); *G09G 3/20* (2013.01); *G02F 2201/123* (2013.01); *G09G 2300/0426* (2013.01); *G09G 2300/0439* (2013.01); *G09G 2300/0809* (2013.01); *G09G 2310/08* (2013.01)

(58) Field of Classification Search
CPC ......... G09G 3/3688; G09G 2300/0439; G09G 2300/0426; G09G 2300/0809; G09G 2310/08; G09G 3/20; G02F 1/136286; G02F 1/136213; G02F 2201/123
See application file for complete search history.

(56) References Cited

U.S. PATENT DOCUMENTS

| | | | | |
|---|---|---|---|---|
| 8,711,073 B2* | 4/2014 | Lee | ....................... | G09G 3/3677 345/100 |
| 9,093,042 B2* | 7/2015 | Park | ..................... | G09G 3/3648 |
| 9,548,037 B2* | 1/2017 | Jang | ..................... | G09G 3/3696 |
| 9,778,521 B2* | 10/2017 | Jung | .................. | G02F 1/13394 |
| 9,818,368 B2* | 11/2017 | Wu | ..................... | G02B 27/2264 |
| 9,857,640 B2* | 1/2018 | Choi | ................. | G02F 1/134309 |
| 2006/0208984 A1* | 9/2006 | Kim | ..................... | G09G 3/3614 345/90 |
| 2006/0227095 A1* | 10/2006 | Kim | ..................... | G09G 3/3659 345/100 |
| 2007/0132899 A1* | 6/2007 | Cheng | ............... | G02F 1/136213 349/38 |
| 2009/0021509 A1* | 1/2009 | Lee | ....................... | G09G 3/3677 345/213 |

(Continued)

FOREIGN PATENT DOCUMENTS

| KR | 1020130072875 A | 7/2013 |
|---|---|---|
| KR | 101398121 B1 | 6/2014 |

(Continued)

*Primary Examiner* — Carolyn R Edwards
(74) *Attorney, Agent, or Firm* — Cantor Colburn LLP

(57) ABSTRACT

A display device includes first and second pixels. The first pixel includes a first high pixel connected to an i-th gate line and a j-th data line and a first low pixel connected to an (i+1)-th gate line and the j-th data line. The second pixel includes a second high pixel connected to the i-th gate line and a (j+1)-th data line and a second low pixel connected to the (i+1)-th gate line and the (j+1)-th data line.

20 Claims, 9 Drawing Sheets

(56) References Cited

U.S. PATENT DOCUMENTS

| | | | | |
|---|---|---|---|---|
| 2010/0289884 | A1* | 11/2010 | Kang | G02B 27/2228 |
| | | | | 348/58 |
| 2013/0162616 | A1* | 6/2013 | Park | G09G 3/3648 |
| | | | | 345/211 |
| 2014/0218347 | A1* | 8/2014 | Lee | G02F 1/136286 |
| | | | | 345/211 |
| 2015/0091883 | A1* | 4/2015 | Pyun | G09G 3/2074 |
| | | | | 345/204 |
| 2015/0187293 | A1* | 7/2015 | Yoo | G09G 3/3607 |
| | | | | 345/694 |
| 2016/0306202 | A1* | 10/2016 | Lee | G02F 1/133377 |

FOREIGN PATENT DOCUMENTS

| | | |
|---|---|---|
| KR | 1020140099025 A | 8/2014 |
| KR | 1020140141363 A | 12/2014 |
| KR | 1020150070776 A | 6/2015 |
| KR | 1020170000026 A | 1/2017 |

\* cited by examiner

DISPLAY DEVICE

This application claims priority to Korean Patent Application No. 10-2017-0129121, filed on Oct. 10, 2017, and all the benefits accruing therefrom under 35 U.S.C. § 119, the content of which in its entirety is herein incorporated by reference.

BACKGROUND

1. Field

The disclosure relates to a display device. More particularly, the disclosure relates to a display device with improved visibility by securing a charging time of pixels.

2. Description of the Related Art

Generally, a display device includes gate lines, data lines, and pixels connected to the gate lines and the data lines to display an image. The pixels may receive data signals through the data lines in response to gate signals applied thereto through the gate lines and display grayscales corresponding to the data signals.

Recently, the number of the pixels arranged in the display device has increased to implement high resolution. As the number of the pixels increases, the number of the gate signals for driving the pixels increases.

SUMMARY

In a display device having high resolution, where the number of the gate signals increases, an active period of each of the gate signals decreases, and thus a technique for securing a charging time is desired.

The disclosure provides a display device with improved visibility by securing a charging time of pixels.

According to an embodiment of the invention, a display device includes first and second pixels. In such an embodiment, the first pixel includes a first high pixel connected to an i-th gate line and a j-th data line, where each of the i and j is a natural number, and a first low pixel connected to an (i+1)-th gate line and the j-th data line. In such an embodiment, the second pixel includes a second high pixel connected to the i-th gate line and a (j+1)-th data line, and a second low pixel connected to the (i+1)-th gate line and the (j+1)-th data line.

In an embodiment, an (i+1)-th gate signal applied to the (i+1)-th gate line may overlap with an i-th gate signal applied to the i-th gate line.

In an embodiment, an active period of the i-th gate signal may be longer than a second active period of the (i+1)-th gate signal.

In an embodiment, a rising edge of the i-th gate signal may overlap with a rising edge of the (i+1)-th gate signal.

In an embodiment, a falling edge of the i-th gate signal may overlap with a falling edge of the (i+1)-th gate signal.

In an embodiment, a level of the i-th gate signal may be greater than a level of the (i+1)-th gate signal.

In an embodiment, the first high pixel may include: a first transistor connected to the i-th gate line and the j-th data line; and a first high pixel electrode connected to the first transistor, and the second high pixel may include: a second transistor connected to the i-th gate line and the (j+1)-th data line; and a second high pixel electrode connected to the second transistor.

In an embodiment, the first low pixel may include: a third transistor connected to the (i+1)-th gate line and the j-th data line; and a first low pixel electrode connected to the third transistor, and the second low pixel may include: a fourth transistor connected to the (i+1)-th gate line and the (j+1)-th data line; and a second low pixel electrode connected to the fourth transistor. In such an embodiment, the i-th and (i+1)-th gate lines may extend in a first direction, the j-th and (j+1)-th data lines may extend in a second direction crossing the first direction, and the first high pixel electrode, the first low pixel electrode, the second high pixel electrode and the second low pixel electrode may be arranged in the second direction.

In an embodiment, the first and second transistors may be disposed between the first high pixel electrode and the first low pixel electrode.

In an embodiment, the first transistor may include a first gate electrode branched from the i-th gate line, a first source electrode branched from the j-th data line, and a first drain electrode connected to the first high pixel electrode. In such an embodiment, the first drain electrode may extend in the second direction via the first high pixel electrode and be connected to a first connection electrode branched from an upper end of the first high pixel electrode.

In an embodiment, the first high pixel electrode may include an edge portion having a rectangular frame shape, a trunk portion disposed in the edge portion, having a cross shape, and connected to the edge portion, and a plurality of branch portions extending from the trunk portion in an oblique direction and connected to the edge portion. In such an embodiment, the first drain electrode may overlap with a portion extending in the second direction of the trunk portion.

In an embodiment, the second transistor may include a second gate electrode branched from the i-th gate line, a second source electrode branched from the (j+1)-th data line, and a second drain electrode connected to the second high pixel electrode. In such an embodiment, the second drain electrode may extend in the second direction via the first low pixel electrode and be connected to a second connection electrode branched from an upper end of the second high pixel electrode.

In an embodiment, the third and fourth transistors may be disposed between the second high pixel electrode and the second low pixel electrode.

In an embodiment, the third transistor may include a third gate electrode branched from the (i+1)-th gate line, a third source electrode branched from the j-th data line, and a third drain electrode connected to the first low pixel electrode. In such an embodiment, the third drain electrode may extend in the second direction via the second high pixel electrode and be connected to a third connection electrode branched from a lower end of the first low pixel electrode.

In an embodiment, the fourth transistor may include a fourth gate electrode branched from the (i+1)-th gate line, a fourth source electrode branched from the (j+1)-th data line, and a fourth drain electrode connected to the second low pixel electrode. In such an embodiment, the fourth drain electrode may extend in the second direction via the second low pixel electrode and be connected to a fourth connection electrode branched from a lower end of the second low pixel electrode.

According to embodiments, two different gate signals overlapping with each other is applied to high and low pixels of each pixel, respectively. Accordingly, in such embodiments, the active period of the gate signals becomes longer, and thus the charging time for the pixels may be sufficiently secured. In such embodiments, since each of the pixels includes the high pixel charged with the high pixel voltage and the low pixel charged with the low pixel voltage, the visibility of the display device may be improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
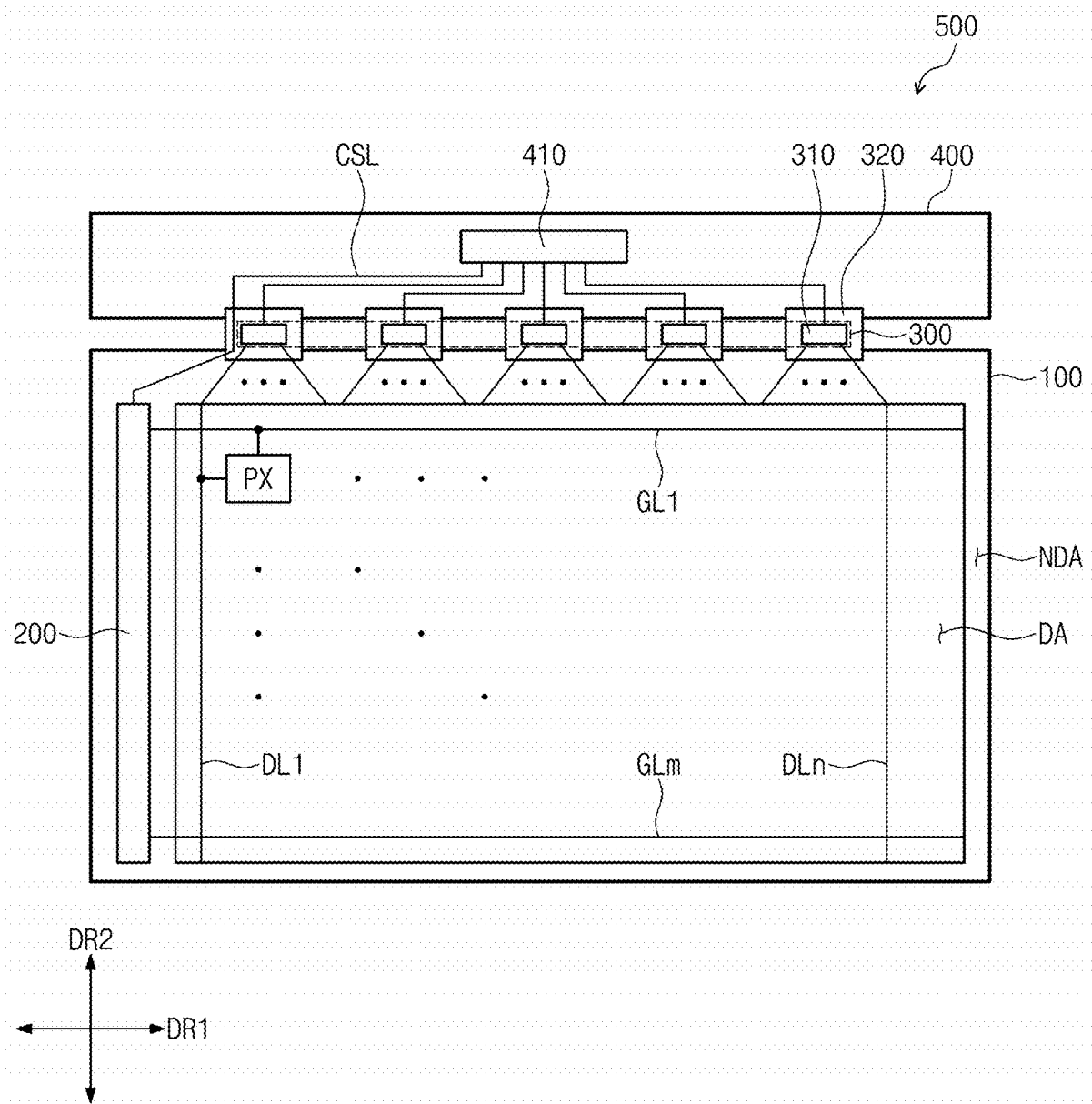
FIG. 1 is a plan view showing a display device according to an exemplary embodiment of the disclosure.

Features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be through and complete and will fully convey the invention to those skilled in the art, and the invention will only be defined by the appended claims. Like reference numerals denote like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to plan views and cross-sectional views that are schematic illustrations of idealized exemplary embodiments. As such, variations from the shapes of the illustrations as a result, for example, of manufacturing techniques and/or tolerances, are to be expected. Thus, exemplary embodiments should not be construed as limited to particular shapes of regions illustrated herein but are to include deviations in shapes that result, for example, from manufacturing. Thus the regions illustrated in the figures are schematic in nature and their shapes are not intended to illustrate the actual shape of a region of a device and are not intended to limit the scope of the exemplary embodiments.

Hereinafter, exemplary embodiments of the invention will be described in detail with reference to the accompanying drawings.

FIG. 1 is a plan view showing a display device 500 according to an exemplary embodiment of the disclosure.

Referring to FIG. 1, an exemplary embodiment of the display device 500 includes a display panel 100, a gate driver 200, a data driver 300, a printed circuit board 400, and a timing controller 410. The display panel 100 may have a rectangular shape having long sides in a first direction DR1 and short sides in a second direction DR2 crossing the first direction DR1.

In an exemplary embodiment, the display panel 100 may be a liquid crystal display panel including a first substrate, a second substrate facing the first substrate, and a liquid crystal layer interposed between the first substrate and the second substrate, but not being limited thereto. In an alternative exemplary embodiment, the display panel 100 may be one of various panels, such as an electrophoretic display panel including an electrophoretic layer, an electrowetting display panel including an electrowetting layer and an organic light emitting display panel including an organic light emitting layer, for example.

The display panel 100 includes a plurality of gate lines GL1 to GLm, a plurality of data lines DL1 to DLn, and a plurality of pixels PX. Here, each of the "m" and "n" is a natural number. For the convenience of illustration, FIG. 1 shows only one pixel, however, plural pixels PX may be arranged in the display panel 100. The display panel 100 includes a display area DA for displaying the image and a non-display area NDA surrounding the display area DA when viewed in a plan view, and no image is displayed in the non-display area NDA.

The gate lines GL1 to GLm and the data lines DL1 to DLn are insulated from each other while crossing each other. The gate lines GL1 to GLm extend in the first direction DR1 and are connected to the gate driver 200. The data lines DL1 to DLn extend in the second direction DR2 and are connected to the data driver 300.

The pixels PX may be arranged in areas defined by the gate lines GL1 to GLm and the data lines DL1 to DLn crossing the gate lines GL1 to GLm. The pixels PX may be arranged substantially in a matrix form in the display area DA, and connected to the gate lines GL1 to GLm and the data lines DL1 to DLn. Each of the pixels PX may display one of a red color, a green color, a blue color, and a white color.

The gate driver 200 may be disposed in the non-display area NDA of the display panel 100, which is adjacent to one short side of the short sides of the display panel 100. The gate driver 200 may be formed through a same process with transistors of the pixels PX and mounted on the display panel 100 in an amorphous silicon thin film transistor ("TFT") gate driver circuit ("ASG") form or an oxide silicon TFT gate driver circuit ("OSG") form, but not being limited thereto or thereby. Alternatively, the gate driver 200 may include a plurality of gate driving chips, and the gate driving chips may be connected to the display panel 100 through flexible printed circuit boards or mounted on the display panel 100 in a chip-on-glass ("COG") manner.

The data driver 300 includes a plurality of source driving chips 310, and the source driving chips 310 are mounted on flexible printed circuit boards 320. The source driving chips 310 are connected to the printed circuit board 400 and the non-display area NDA of the display panel 100, which is adjacent to one long side of the long sides of the display panel 100 through the flexible printed circuit boards 320, but not being limited thereto or thereby. Alternatively, the source driving chips 310 may be mounted on the display panel 100 in a chip-on-glass ("COG") manner.

The timing controller 410 may be mounted on the printed circuit board 400 in an integrated circuit chip form. The timing controller 410 is connected to the gate driver 200 and the data driver 300 through control signal lines CSL. The timing controller 410 applies image data to the data driver 300 to display an image corresponding to the image data. The timing controller 410 applies a gate control signal to the gate driver 200 to control an operation of the gate driver 200 and applies a data control signal to the data driver 300 to control an operation of the data driver 300.

The gate driver 200 generates a plurality of gate signals in response to the gate control signal from the timing controller 410. The gate signals are provided to the pixels PX through the gate lines GL1 to GLm in the unit of row or on a row-by-row basis. As a result, the pixels PX may be driven in the unit of row or on a row-by-row basis.

The data driver 300 generates data voltages in analog form, which correspond to the image data, in response to the data control signal from the timing controller 410. The data voltages are provided to the pixels PX through the data lines DL1 to DLn.

The pixels PX receive the data voltages in response to the gate signals applied thereto. The pixels PX driven by the data voltages display the image. Although not shown in figures, the display device 500 may further include a backlight unit disposed at a rear side of the display panel 100 to provide a light to the display panel 100.

Figure 2:
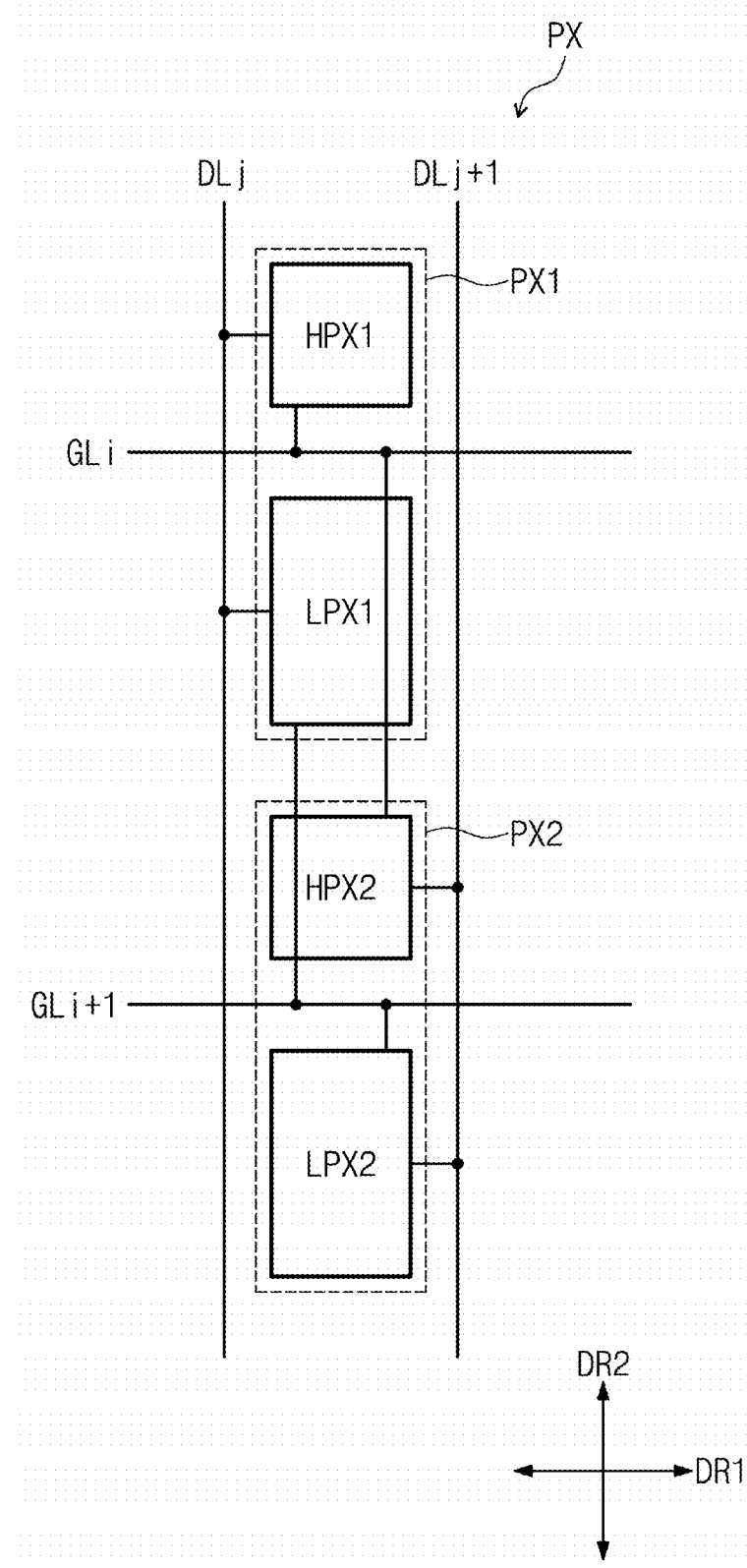
FIG. 2 is a view showing an exemplary embodiment of pixels shown in FIG. 1.

FIG. 2 is a view showing an exemplary embodiment of the pixels PX shown in FIG. 1.

For convenience of illustration and description, FIG. 2 shows an exemplary embodiment of two adjacent pixels among the pixels PX, and other adjacent pixels may have the same configuration as the two adjacent pixels.

Referring to FIG. 2, an exemplary embodiment the pixels PX include a first pixel PX1 and a second pixel PX2. In such an embodiment, each pixel PX may include two sub-pixels. Herein, two sub-pixels of each pixel PX that receive different voltages from each other based on a same data voltage are defined as a high pixel and a low pixel. In an exemplary embodiment, as shown in FIG. 2, the first pixel PX1 includes a first high pixel HPX1 and a first low pixel LPX1, and the second pixel PX2 includes a second high pixel HPX2 and a second low pixel LPX2.

The first high pixel HPX1 is connected to an i-th gate line GLi among the gate lines GL1 to GLm and a j-th data line DLj among the data lines DL1 to DLn. The first low pixel LPX1 is connected to an (i+1)-th gate line GLi+1 among the gate lines GL1 to GLm and the j-th data line DLj among the data lines DL1 to DLn. Here, each of the "i" and "j" is a natural number.

The second high pixel HPX2 is connected to the i-th gate line GLi and a (j+1)-th data line DLj+1 among the data lines DL1 to DLn. The second low pixel LPX2 is connected to the (i+1)-th gate line GLi+1 and the (j+1)-th data line DLj+1.

The first and second high pixels HPX1 and HPX2 may have a same size as each other, and the first and second low pixels LPX1 and LPX2 may have a same size as each other. The first high pixel HPX1 may be greater than the first low pixel LPX1, and the second high pixel HPX2 may be greater than the second low pixel LPX2.

The first and second high pixels HPX1 and HPX2 may be charged with a high pixel voltage, and the first and second low pixels LPX1 and LPX2 may be charged with a low pixel voltage less than the high pixel voltage. Operations of charging the first and second high pixels HPX1 and HPX2 and the first and second low pixels LPX1 and LPX2 with the high pixel voltage and the low pixel voltage will be described in detail later.

Figure 3:
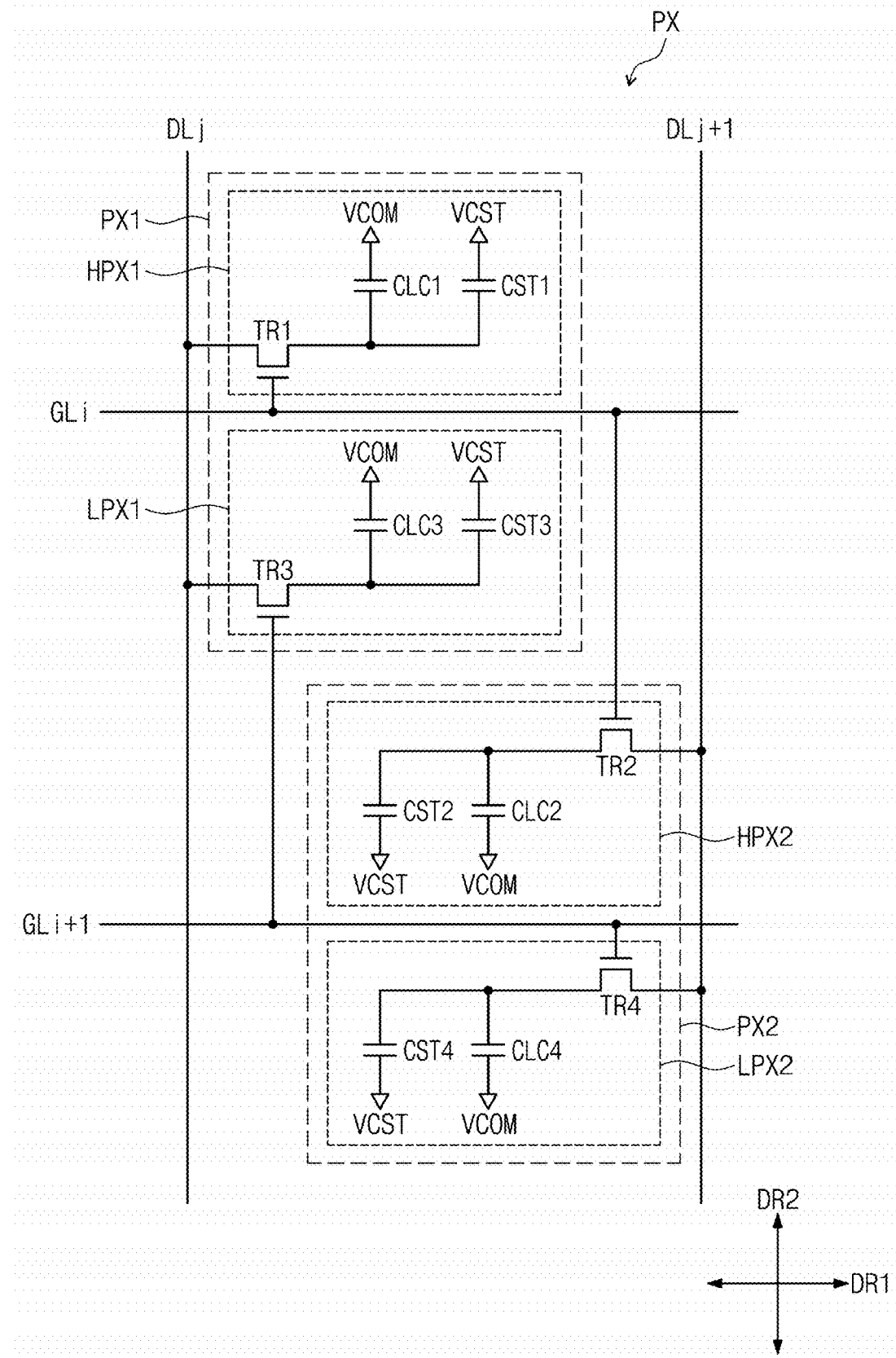
FIG. 3 is an equivalent circuit diagram of a first pixel and a second pixel shown in FIG. 2.

FIG. 3 is an equivalent circuit diagram of the first pixel PX1 and the second pixel PX2 shown in FIG. 2.

Referring to FIG. 3, the first high pixel HPX1 includes a first transistor TR1 connected to the i-th gate line GLi and the j-th data line DLj, a first liquid crystal capacitor CLC1 connected to the first transistor TR1, and a first storage capacitor CST1 connected to the first transistor TR1. The second high pixel HPX2 includes a second transistor TR2 connected to the i-th gate line GLi and the (j+1)-th data line DLj+1, a second liquid crystal capacitor CLC2 connected to the second transistor TR2, and a second storage capacitor CST2 connected to the second transistor TR2.

The first low pixel LPX1 includes a third transistor TR3 connected to the (i+1)-th gate line GLi+1 and the j-th data line DLj, a third liquid crystal capacitor CLC3 connected to the third transistor TR3, and a third storage capacitor CST3 connected to the third transistor TR3. The second low pixel LPX2 includes a fourth transistor TR4 connected to the (i+1)-th gate line GLi+1 and the (j+1)-th data line DLj+1, a fourth liquid crystal capacitor CLC4 connected to the fourth transistor TR4, and a fourth storage capacitor CST4 connected to the fourth transistor TR4.

The first, second, third and fourth transistors TR1, TR2, TR3 and TR4 are turned on in response to the gate signal applied thereto through the i-th gate line GLi and the (i+1)-th gate line GLi+1. The turned-on first, second, third and fourth transistors TR1, TR2, TR3 and TR4 receive the data voltages through the j-th data line DLj and the (j+1)-th data line DLj+1, and provide the data voltages to the first, second, third and fourth liquid crystal capacitors CLC1, CLC2, CLC3 and CLC4, respectively.

The first, second, third and fourth liquid crystal capacitors CLC1, CLC2, CLC3 and CLC4 receive a common voltage VCOM. Liquid crystals of the first, second, third and fourth liquid crystal capacitors CLC1, CLC2, CLC3 and CLC4 are operated by an electric field formed by a difference in voltage between the data voltages and the common voltage to control a light transmittance thereof, such that the image may be displayed.

The first, second, third and fourth storage capacitors CST1, CST2, CST3 and CST4 may receive a storage voltage VCST, but not being limited thereto or thereby. In an alternative exemplary embodiment, the first, second, third, and fourth storage capacitors CST1, CST2, CST3 and CST4 may receive the common voltage VCOM. The first, second, third and fourth storage capacitors CST1, CST2 CST3, and CST4 may compensate a charge rate of the first, second, third and fourth liquid crystal capacitors CLC1, CLC2, CLC3 and CLC4. Alternatively, the first, second, third, and fourth storage capacitors CST1, CST2, CST3 and CST4 may be omitted.

Figure 4:
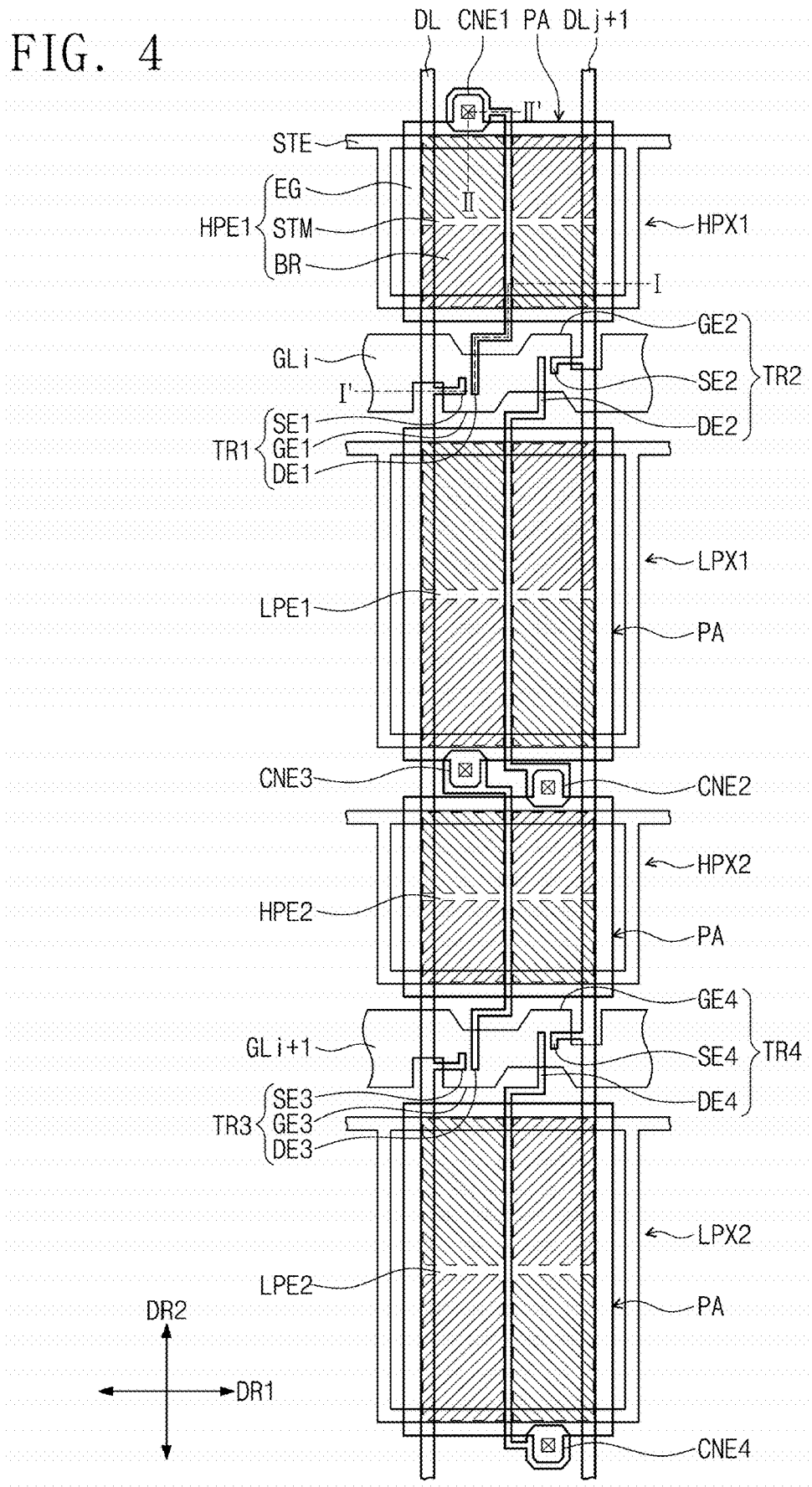
FIG. 4 is a plan view of a first pixel and a second pixel shown in FIG. 3.

FIG. 4 is a plan view of the first pixel PX1 and the second pixel PX2 shown in FIG. 3.

Referring to FIG. 4, in an exemplary embodiment, the first high pixel HPX1 includes the first transistor TR1 connected to the i-th gate line GLi and the j-th data line DLj and a first high pixel electrode HPE1 connected to the first transistor TR1. The second high pixel HPX2 includes the second transistor TR2 connected to the i-th gate line GLi and the (j+1)-th data line DLj+1 and a second high pixel electrode HPE2 connected to the second transistor TR2. The first and second transistors TR1 and TR2 are disposed adjacent to each other.

The first low pixel LPX1 includes the third transistor TR3 connected to the (i+1)-th gate line GLi+1 and the j-th data line DLj and a first low pixel electrode LPE1 connected to the third transistor TR3. The second low pixel LPX2 includes the fourth transistor TR4 connected to the (i+1)-th gate line GLi+1 and the (j+1)-th data line DLj+1 and a second low pixel electrode LPE2 connected to the fourth transistor TR4. The third and fourth transistors TR3 and TR4 are disposed adjacent to each other.

The first high pixel electrode HPE1, the first low pixel electrode LPE1, the second high pixel electrode HPE2, and the second low pixel electrode LPE2 are arranged in the second direction DR2. The first and second transistors TR1 and TR2 are disposed between the first high pixel electrode HPE1 and the first low pixel electrode LPE1, and the third and fourth transistors TR3 and TR4 are disposed between the second high pixel electrode HPE2 and the second low pixel electrode LPE2.

Figure 5:
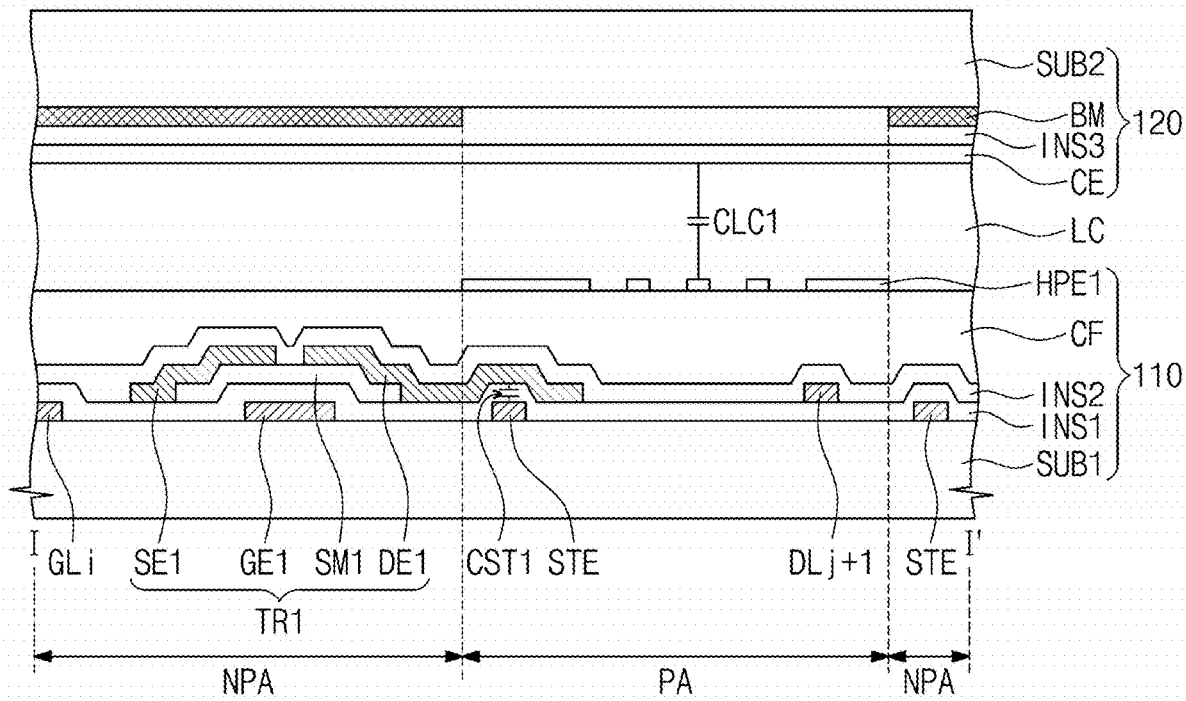
FIG. 5 is a cross-sectional view taken along line I-I' shown in FIG. 4.

In such an embodiment, as shown in FIGS. 4 and 5, areas in which the first high pixel electrode HPE1, the first low pixel electrode LPE1, the second high pixel electrode HPE2 and the second low pixel electrode LPE2 are arranged may be defined as pixel areas PA, and a peripheral area of the pixel areas PA may be defined as a non-pixel area NPA.

The first high pixel electrode HPE1, the first low pixel electrode LPE1, the second high pixel electrode HPE2, and the second low pixel electrode LPE2 have substantially the same configuration as each other. In one exemplary embodiment, for example, the first high pixel electrode HPE1 includes an edge portion EG having a rectangular frame shape, a trunk portion STM disposed in the edge portion EG having a cross shape, and connected to the edge portion EG and a plurality of branch portions BR extending from the trunk portion STM in an oblique direction and connected to the edge portion EG. The edge portion EG the trunk portion STM, and the branch portions BR may be integrally formed with each other as a single unitary and indivisible unit.

The first high pixel electrode HPE1 may be divided into four domains by the trunk portion STM. The branch portions BR may extend in different directions in each domain. The branch portions BR in each domain are arranged substantially in parallel to each other and spaced apart from each other while extending in da same direction as each other. The branch portions BR, which are adjacent to each other, are spaced apart from each other by a distance of micrometers to define a plurality of micro-slits.

Liquid crystal molecules of the liquid crystal layer LC are pre-tilted in different directions in each domain in the pixel area PA of the first high pixel electrode HPE1 by the micro-slits. Accordingly, four domains in which alignment directions of the liquid crystal molecules are different from each other are defined in each pixel area PA of the liquid crystal layer. Each of the first low pixel electrode LPE1, the second high pixel electrode HPE2 and the second low pixel electrode LPE2 may include the edge portion, the trunk portion and the branch portions, and may be divided into four domains in which the alignment directions of the liquid crystal molecules are different from each other by the trunk portion. In such an embodiment, as described above, the liquid crystal molecules in each pixel area PA are inclined in various directions, such that a reference viewing angle of the display device 500 may increase.

In an exemplary embodiment, the first transistor TR1 includes a first gate electrode GE1 branched from the i-th gate line GLi, a first source electrode SE1 branched from the j-th data line DLj, and a first drain electrode DE1 connected to the first high pixel electrode HPE1. The first drain electrode DE1 extends in the second direction DR2 via the first high pixel electrode HPE1 and is connected to a first connection electrode CNE1 branched from an upper end of the first high pixel electrode HPE1.

The first drain electrode DE1 extends in the second direction DR2 and extends in the first direction DR1 after being bent to the first direction DR1 at a portion adjacent to a lower end of the first high pixel electrode HPE1. Then, the first drain electrode DE1 is bent to the second direction DR2 and extends in the second direction DR2 via the first high pixel electrode HPE1. In such an embodiment, the first drain electrode DE1 may overlap with a trunk portion STM extending in the second direction DR2 of the trunk portion STM of the first high pixel electrode HPE1 when viewed from a plan view in at thickness direction of a base substrate SUB1 (shown in FIG. 5). The first drain electrode DE1 extending in the second direction DR2 via the first high pixel electrode HPE1 is bent to the first direction DR1 at a portion adjacent to the upper end of the first high pixel electrode HPE1 and connected to the first connection electrode CNE1.

In such an embodiment, the second transistor TR2 includes a second gate electrode GE2 branched from the i-th gate line GLi, a second source electrode SE2 branched from the (j+1)-th data line DLj+1, and a second drain electrode DE2 connected to the second high pixel electrode HPE2. The second drain electrode DE2 extends in the second direction DR2 via the first low pixel electrode LPE1 and is connected to a second connection electrode CNE2 branched from an upper end of the second high pixel electrode HPE2.

The second drain electrode DE2 extends in the second direction DR2 and extends in the first direction DR1 after being bent to the first direction DR1 at a portion adjacent to an upper end of the first low pixel electrode LPE1. Then, the second drain electrode DE2 is bent to the second direction DR2, and extends upwardly in the second direction DR2 via the first low pixel electrode LPE1. In such an embodiment, the second drain electrode DE2 may overlap with a trunk portion STM extending in the second direction DR2 of the trunk portion STM of the first low pixel electrode LPE1 when viewed from the plan view. The second drain electrode DE2 extending in the second direction DR2 via the first low pixel electrode LPE1 is bent to the first direction DR1 at a portion adjacent to a lower end of the first low pixel electrode LPE1 and connected to the second connection electrode CNE2.

In such an embodiment, the third transistor TR3 includes a third gate electrode GE3 branched from the (i+1)-th gate line GLi+1, a third source electrode SE3 branched from the j-th data line DLj, and a third drain electrode DE3 connected to the first low pixel electrode LPE1. The third drain electrode DE3 extends downwardly in the second direction DR2 via the second high pixel electrode HPE2 and is connected to a third connection electrode CNE3 branched from the lower end of the first low pixel electrode LPE1.

The third drain electrode DE3 extends in the second direction DR2 and extends in the first direction DR1 after being bent to the first direction DR1 at a portion adjacent to a lower end of the second high pixel electrode HPE2. Then, the third drain electrode DE3 is bent to the second direction DR2, and extends upwardly in the second direction DR2 via the second high pixel electrode HPE2. In such an embodiment, the third drain electrode DE3 may overlap with a trunk portion extending in the second direction DR2 of the trunk portion of the second high pixel electrode HPE2 when viewed from the plan view. The third drain electrode DE3 extending in the second direction DR2 via the second high pixel electrode HPE2 is bent to the first direction DR1 at a portion adjacent to the upper end of the second high pixel electrode HPE2 and connected to the third connection electrode CNE3.

In such an embodiment, the fourth transistor TR4 includes a fourth gate electrode GE4 branched from the (i+1)-th gate line GLi+1, a fourth source electrode SE4 branched from the (j+1)-th data line DLj+1, and a fourth drain electrode DE4 connected to the second low pixel electrode LPE2. The fourth drain electrode DE4 extends in the second direction DR2 via the second low pixel electrode LPE2 and is connected to a fourth connection electrode CNE4 branched from a lower end of the second low pixel electrode LPE2.

The fourth drain electrode DE4 extends in the second direction DR2 and extends in the first direction DR1 after being bent to the first direction DR1 at a portion adjacent to an upper end of the second low pixel electrode LPE2. Then, the fourth drain electrode DE4 is bent to the second direction DR2, and extends downwardly in the second direction DR2 via the second low pixel electrode LPE2. In such an embodiment, the fourth drain electrode DE4 may overlap with a trunk portion extending in the second direction DR2 of the trunk portion of the second low pixel electrode LPE2 when viewed from the plan view. The fourth drain electrode DE4 extending in the second direction DR2 via the second low pixel electrode LPE2 is bent to the first direction DR1 at a portion adjacent to the lower end of the second low pixel electrode LPE2 and connected to the fourth connection electrode CNE4.

In an exemplary embodiment, storage electrodes STE have a rectangular frame shape and are respectively disposed in the first high pixel HPX1, the first low pixel LPX1, the second high pixel HPX2, and the second low pixel LPX2. Among the rectangular frame shapes of the storage electrodes STE, portions extending in the first direction DR1 may overlap with the first high pixel electrode HPE1, the first low pixel electrode LPE1, the second high pixel electrode HPE2, and the second low pixel electrode LPE2, respectively when viewed from the plan view. Among the rectangular frame shapes of the storage electrodes STE, portions extending in the second direction DR2 may be disposed to be adjacent to the first high pixel electrode HPE1, the first low pixel electrode LPE1, the second high pixel electrode HPE2, and the second low pixel electrode LPE2, respectively.

Figure 6:
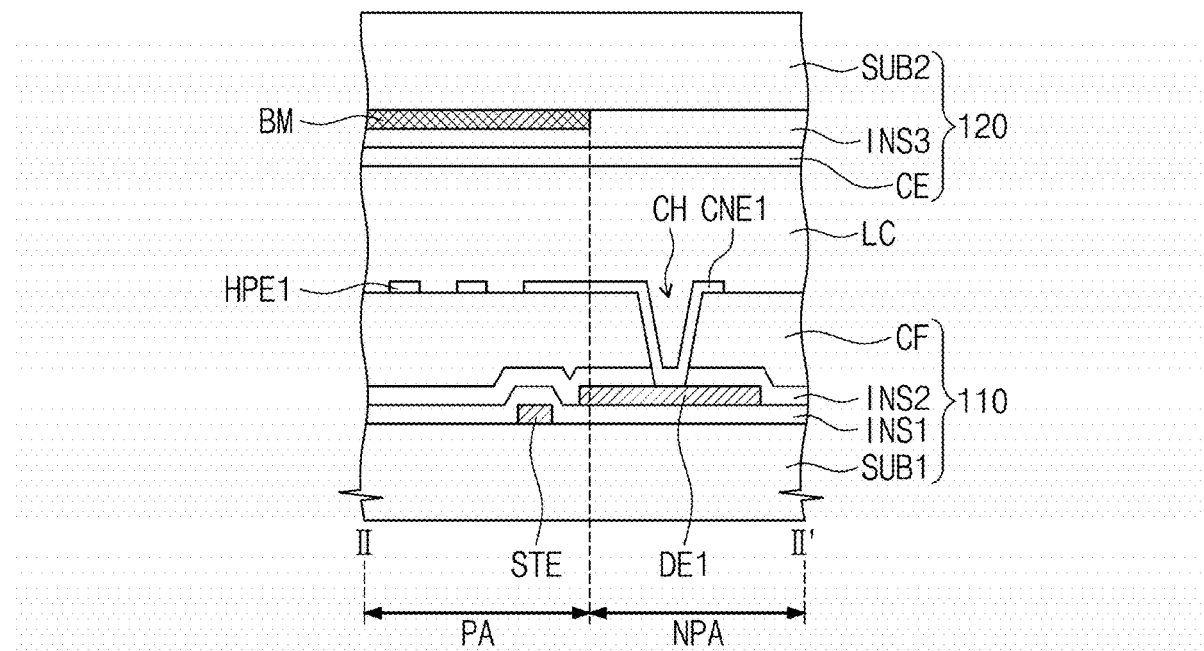
FIG. 6 is a cross-sectional view taken along line II-II' shown in FIG. 4.

FIG. 5 is a cross-sectional view taken along line I-I' shown in FIG. 4, and FIG. 6 is a cross-sectional view taken along line II-II' shown in FIG. 4.

FIGS. 5 and 6 are views showing a cross-section configuration of the first high pixel HPX1, and each of the first low pixel LPX1, the second high pixel HPX2, and the second low pixel LPX2, which are not shown in FIGS. 5 and 6, have substantially the same cross-section configuration as that of the first high pixel HPX1.

Referring to FIGS. 5 and 6, the first high pixel HPX1 may include a first substrate 110, a second substrate 120 facing the first substrate 110, and a liquid crystal layer LC interposed between the first substrate 110 and the second substrate 120. The first substrate 110 includes a base substrate SUB1, the first transistor TR1, a color filter CF, and the first high pixel electrode HPE1. The second substrate 120 includes a second base substrate SUB2, a black matrix BM, a third insulating layer INS3, and a common electrode CE.

The first gate electrode GE1 of the first transistor TR1 is disposed on the first base substrate SUB1. The first base substrate SUB1 may be a transparent or opaque insulating substrate. In one exemplary embodiment, for example, the first base substrate SUB1 may be, but not limited to, a silicon substrate, a glass substrate, or a plastic substrate.

A first insulating layer INS1 is disposed on the first base substrate SUB1 to cover the first gate electrode GE1. The first insulating layer INS1 may be referred to as a gate insulating layer and may be an inorganic insulating layer including an inorganic material. The storage electrode STE may be substantially simultaneously formed on a same layer as the first gate electrode GE1 during a same manufacturing process.

A first semiconductor layer SM1 of the first transistor TR1 is disposed on the first insulating layer INS1 covering the first gate electrode GE1. Although not shown in figures, the first semiconductor layer SM1 may include an active layer and an ohmic contact layer.

The first source electrode SE1 and the first drain electrode DE1 of the first transistor TR1 are disposed on the first semiconductor layer SM1 and the first insulating layer INS1 and spaced apart from each other. A conductive channel is formed in a region of the first semiconductor layer SM1 between the first source electrode SE1 and the first drain electrode DE1. The first storage capacitor CST1 is collectively defined or formed by the storage electrode STE, the first drain electrode DE1 overlapping with the storage electrode STE, and the first insulating layer INS' between the storage electrode STE and the first drain electrode DE1.

A second insulating layer INS2 is disposed on the first insulating layer INS1 to cover the first transistor TR1. The second insulating layer INS2 may be referred to as a passivation layer and may be an inorganic insulating layer including an inorganic material. The second insulating layer INS2 covers an exposed portion of the first semiconductor layer SM1. The color filter CF is disposed on the second insulating layer INS2. The color filter CF may have one of a red color, a green color, a blue color, and a white color. The color filter CF provides a color to a light passing therethrough from the first high pixel HPX1.

A contact hole CH is defined through the second insulating layer INS2 and the color filter CF to expose a predetermined portion of the first drain electrode DE1. The first high pixel electrode HPE1 is disposed on the color filter CF in the pixel area PA. The first connection electrode CNE1 branched from the first high pixel electrode HPE1 is electrically connected to the first drain electrode DE1 through the contact hole CH.

The black matrix BM is disposed under the second base substrate SUB2 and disposed in the non-pixel area NPA. The second base substrate SUB2 may be a transparent or opaque insulating substrate. The black matrix BM may block a light leakage that may occur at a boundary between the pixel areas PA.

The third insulating layer INS3 is disposed under the second base substrate SUB2 to cover the black matrix BM, and the third insulating layer INS3 may be, but not limited to, an organic insulating layer. The common electrode CE may be disposed under the third insulating layer INS3. The first liquid crystal capacitor CLC1 may be collectively defined or formed by the first high pixel electrode HPE1, the common electrode CE facing the first high pixel electrode HPE1, and the liquid crystal layer LC interposed between the first high pixel electrode HPE1 and the common electrode CE.

The first high pixel electrode HPE1 and the common electrode CE may include a transparent conductive material. In one exemplary embodiment, for example, the first high pixel electrode HPE1 and the common electrode CE may include at least one of indium tin oxide ("ITO"), indium zinc oxide ("IZO"), and indium tin zinc oxide ("ITZO").

The liquid crystal molecules of the liquid crystal layer LC are driven by the electric field generated between the first high pixel electrode HPE1 applied with the data voltage and the common electrode CE applied with the common voltage. The light transmittance is controlled by the liquid crystal molecules driven by the electric field, and thus the image is displayed.

Figure 7:
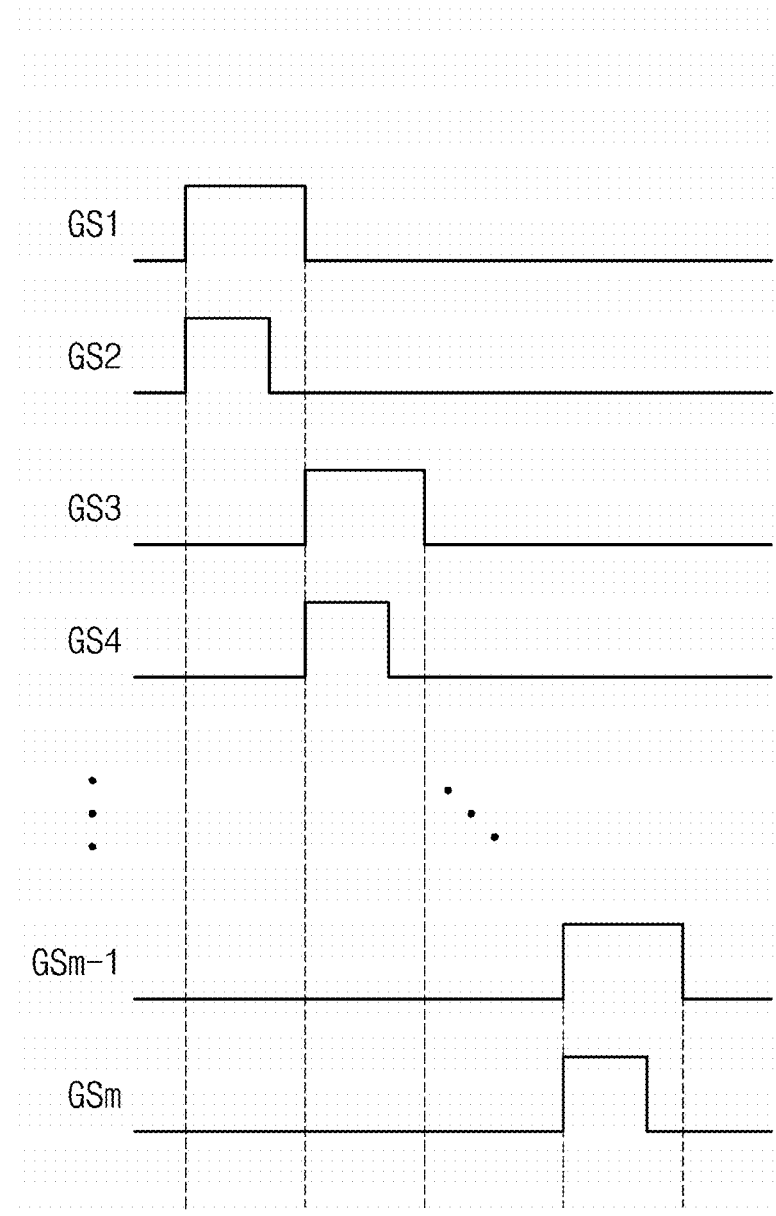
FIG. 7 is a signal timing diagram showing gate signals applied to pixels.
Figure 8:
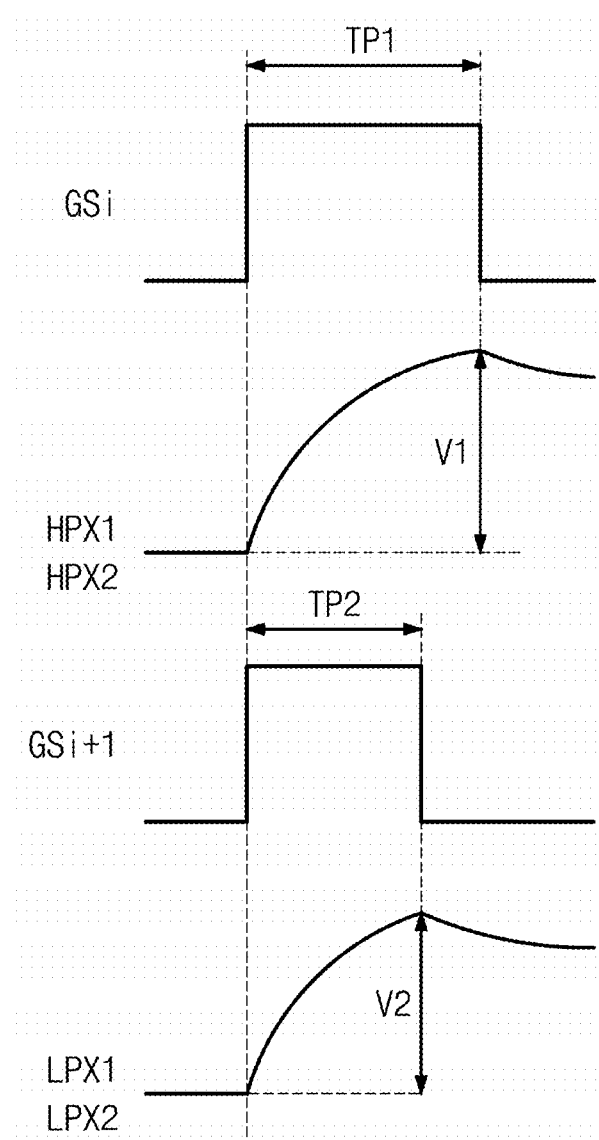
FIG. 8 is a waveform diagram showing an i-th gate signal and an (i+1)-th gate signal respectively applied to the first pixel and the second pixel.
Figure 9:
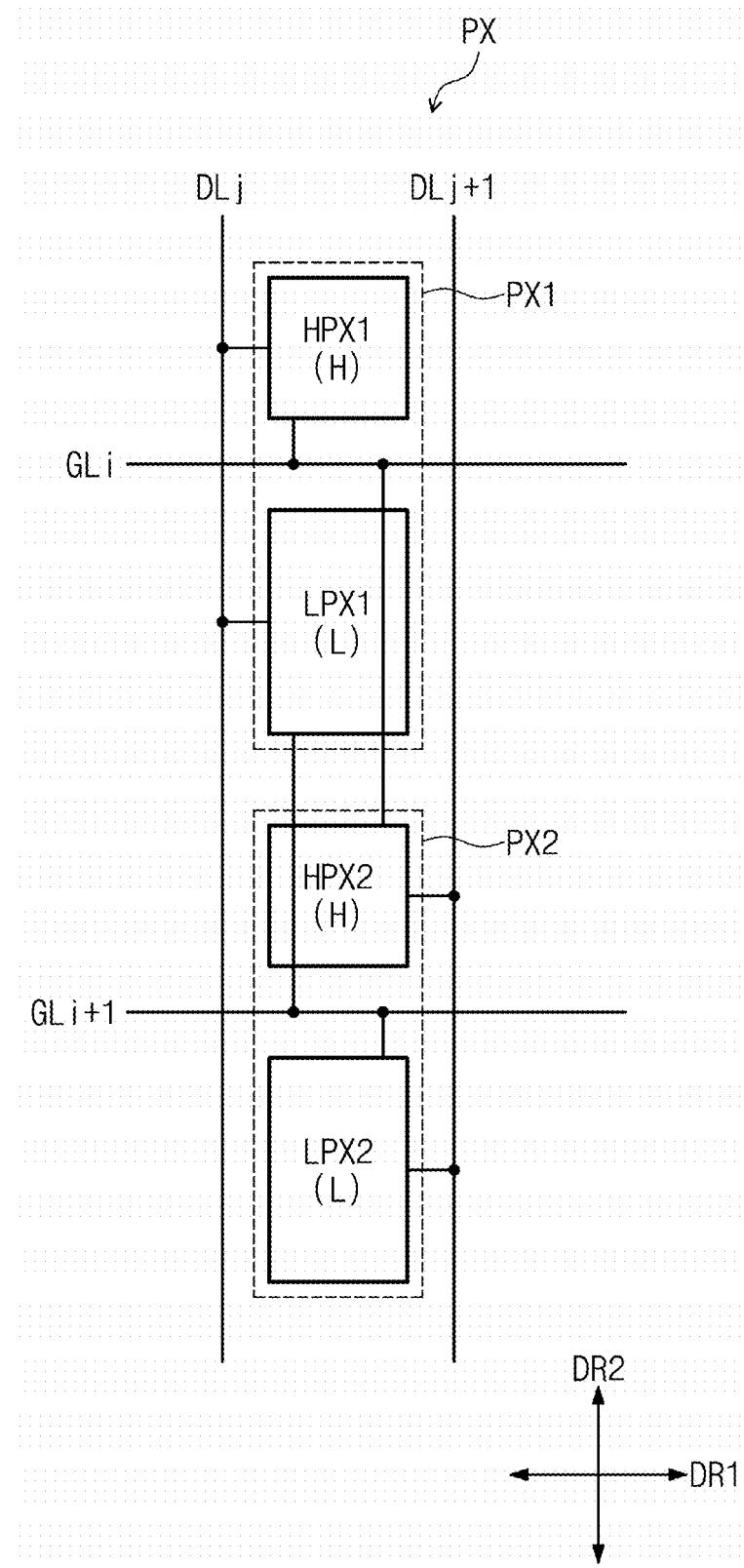
FIG. 9 is a view showing a charging state of the first pixel and the second pixel.

FIG. 7 is a signal timing diagram showing the gate signals applied to pixels, FIG. 8 is a waveform diagram showing the i-th gate signal and the (i+1)-th gate signal respectively applied to the first pixel and the second pixel, and FIG. 9 is a view showing a charging state of the first pixel and the second pixel.

Referring to FIGS. 7, 8, and 9, one pair of gate signals may overlap (e.g., temporally overlap) with each other, and a plurality of pairs of gate signals GS1 to GSm are sequentially output and applied to the pixels PX through the gate lines GL1 to GLm. The one pair of gate signals may be respectively applied to the first pixel PX1 and the second pixel PX2.

The one pair of gate signals may include the i-th gate signal GSi applied to the i-th gate line GLi and the (i+1)-th gate signal GSi+1 applied to the (i+1)-th gate lines GLi+1. The (i+1)-th gate signal GSi+1 overlaps with the i-th gate signal GSi. An active period TP1 of the i-th gate signal GSi (hereinafter, will be referred to as a first active period TP1) is longer than an active period TP2 of the (i+1)-th gate signal GSi+1 (hereinafter, will be referred to as a second active period). A rising edge of the i-th gate signal GSi may overlap with a rising edge of the (i+1)-th gate signal GSi+1.

The i-th gate signal GSi is applied to the first and second high pixels HPX1 and HPX2 through the i-th gate line GLi. The first and second high pixels HPX1 and HPX2 respectively receive the data voltages through the j-th and (j+1)-th data lines DLj and DLj+1 in response to the i-th gate signal GSi. In such an embodiment, as shown in FIG. 8, the first and second high pixels HPX1 and HPX2 are charged with the data voltages during the first active period TP1. The high pixel voltage H charged into each of the first and second high pixels HPX1 and HPX2 may be referred to as a first voltage V1.

The (i+1)-th gate signal GSi+1 is applied to the first and second low pixels LPX1 and LPX2 through the (i+1)-th gate line GLi+1. The first and second low pixels LPX1 and LPX2 respectively receive the data voltages through the j-th and (j+1)-th data lines DLj and DLj+1 in response to the (i+1)-th gate signal GSi+1. In such an embodiment, as shown in FIG. 8, the first and second low pixels LPX1 and LPX2 are charged with the data voltages during the second active period TP2. The low pixel voltage L charged into each of the first and second low pixels LPX1 and LPX2 may be referred to as a second voltage V2.

As the active period of the gate signal increases, an amount of electric charges charged into the pixel increases, and thus the pixel voltage charged into the pixel may become large. In an exemplary embodiment, the second active period TP2 is smaller than the first active period TP1, such that a level of the second voltage V2 may be smaller than that of the first voltage V1.

The first high pixel HPX1 and the first low pixel LPX1 are charged with the pixel voltages having different levels from each other, and the second high pixel HPX2 and the second low pixel LPX2 are charged with the pixel voltages having different levels from each other. In such an embodiment, eyes of a viewer looking at the display device 500 perceive a grayscale corresponding to an intermediate value between the first voltage V1 and the second voltage V2. In such an embodiment, deterioration in side visibility, which may be caused by a distortion of a gamma curve below an intermediate grayscale, may be effectively prevented, and thus the side visibility may be improved.

In a case that the number of the pixels PX arranged on the display device 500 increases to implement a high resolution, the number of the gate signals GS1 to GSm used to drive the pixels PX increases. When the gate signals GS1 to GSm are sequentially output without overlapping with each other, the active period of each of the gate signals for charging the pixels may be reduced. However, in an exemplary embodiment, the one pair of the gate signals are applied to the first and second high pixels HPX1 and HPX2 and the first and second low pixels LPX1 and LPX2 while overlapping with each other, such that the active period of the gate signals GS1 to GSm may increase. Since the active period of the gate signals GS1 to GSm increases, the charging time for the pixels PX may be more secured.

Accordingly, in an exemplary embodiment of the display device 500, the charging time of the pixels may be may sufficiently secured and the visibility may be improved.

Figure 10:
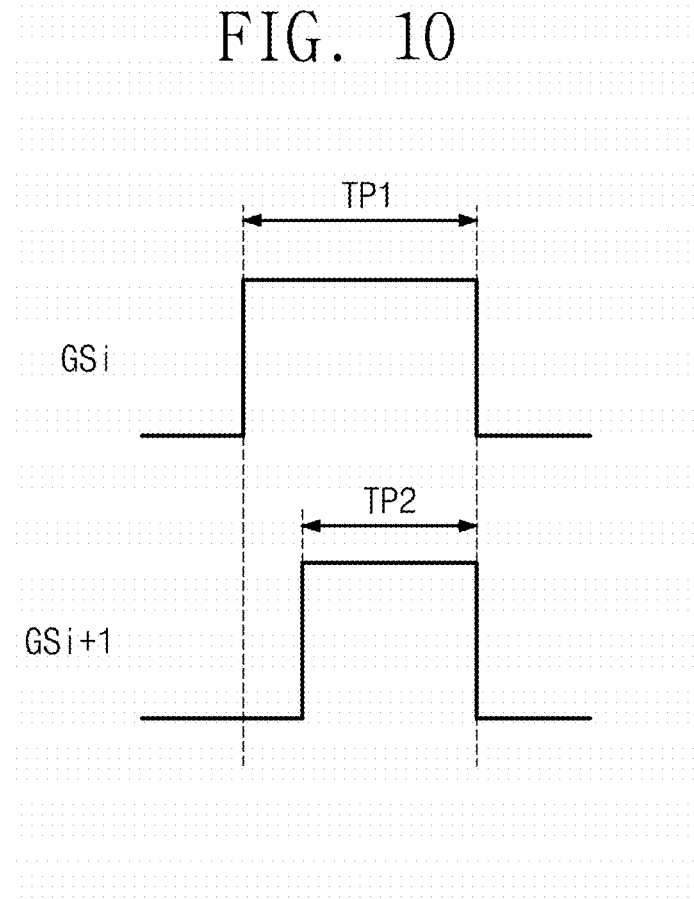
FIGS. 10 and 11 are waveform diagrams showing an i-th gate signal and an (i+1)-th gate signal according to alternative exemplary embodiments of the disclosure.
Figure 11:
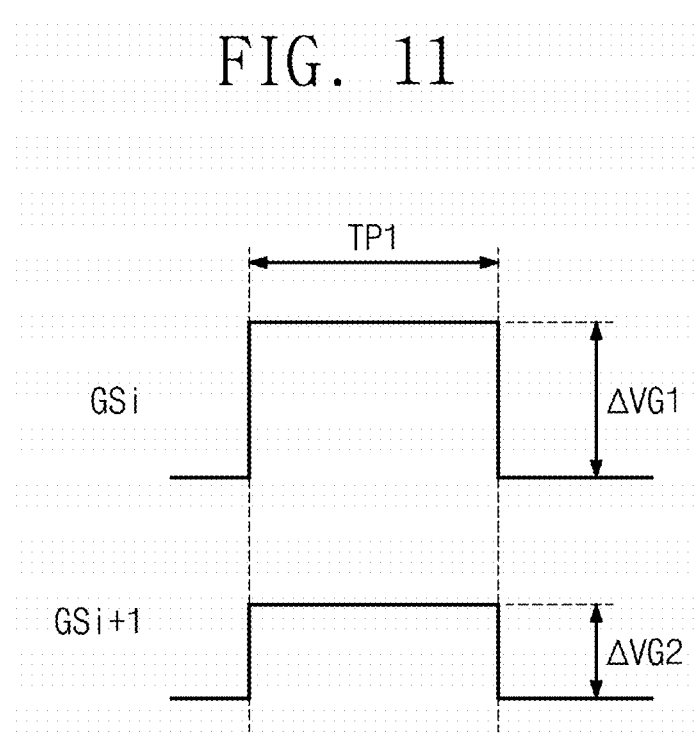

FIGS. 10 and 11 are waveform diagrams showing an i-th gate signal and an (i+1)-th gate signal according to alternative exemplary embodiments of the disclosure.

Referring to FIG. 10, in an alternative exemplary embodiment, a falling edge of an i-th gate signal GSi overlaps with a falling edge of an (i+1)-th gate signal GSi+1. Similar to FIG. 8, a first active period TP1 of the i-th gate signal GSi is longer than a second active period TP2 of the (i+1)-th gate signal GSi+1.

Referring to FIG. 11, in another alternative exemplary embodiment, an i-th gate signal GSi and an (i+1)-th gate signal GSi+1 have active periods of same duration, and overlap with each other. However, in such an embodiment, a level AVG1 of the i-th gate signal GSi is greater than a level AVG2 of the (i+1)-th gate signal GSi+1. The level AVG1 of the i-th gate signal GSi may be defined by a difference between a low level of the i-th gate signal GSi and a high level of the i-th gate signal GSi of the first active period TP1. The level AVG2 of the (i+1)-th gate signal GSi+1 may be defined by a difference between a low level of the (i+1)-th gate signal GSi+1 and a high level of the (i+1)-th gate signal GSi+1 of the first active period TP1.

As the level of the gate signal increases, an amount of a current flowing through the transistor turned on by the gate signal may increase. Accordingly, in such an embodiment, the first and second high pixels HPX1 and HPX2, to which the i-th gate signal GSi is applied, are charged with the high pixel voltage H, and the first and second low pixels LPX1 and LPX2, to which the (i+1)-th gate signal GSi+1 is applied, are charged with the low pixel voltage L.

Although the exemplary embodiments of the invention have been described, it is understood that the invention should not be limited to these exemplary embodiments but various changes and modifications can be made by one ordinary skilled in the art within the spirit and scope of the invention as hereinafter claimed. Therefore, the disclosed subject matter should not be limited to any single embodiment described herein, and the scope of the invention shall be determined according to the attached claims.

What is claimed is:
1. A display device comprising:
a first pixel connected to an i-th gate line, an (i+1)-th gate line and a j-th data line, wherein each of the i and j is a natural number; and
a second pixel connected to the i-th gate line, the (i+1)-th gate line and a (j+1)-th data line, wherein the i-th and (i+1)-th gate lines extend in a first direction, the j-th and (j+1)-th data lines extend in a second direction crossing the first direction, and the first pixel and the second pixel are arranged in the second direction,
wherein the first pixel comprises:
a first high pixel connected to the n i-th gate line and the j-th data line, wherein each of the i and j is a natural number; and
a first low pixel connected to the (i+1)-th gate line and the j-th data line, wherein the second pixel comprises:
a second high pixel connected to the i-th gate line and the (j+1)-th data line; and
a second low pixel connected to the (i+1)-th gate line and the (j+1)-th data line.

2. The display device of claim 1, wherein an (i+1)-th gate signal applied to the (i+1)-th gate line overlaps with an i-th gate signal applied to the i-th gate line.

3. The display device of claim 2, wherein an active period of the i-th gate signal is longer than an active period of the (i+1)-th gate signal.

4. The display device of claim 3, wherein a rising edge of the i-th gate signal overlaps with a rising edge of the (i+1)-th gate signal.

5. The display device of claim 3, wherein a falling edge of the i-th gate signal overlaps with a falling edge of the (i+1)-th gate signal.

6. The display device of claim 2, wherein a level of the i-th gate signal is greater than a level of the (i+1)-th gate signal.

7. The display device of claim 1, wherein
the first high pixel comprises:
a first transistor connected to the i-th gate line and the j-th data line; and
a first high pixel electrode connected to the first transistor, and
the second high pixel comprises:
a second transistor connected to the i-th gate line and the (j+1)-th data line; and
a second high pixel electrode connected to the second transistor.

8. The display device of claim 7, wherein the first and second transistors are disposed adjacent to each other.

9. The display device of claim 7, wherein
the first low pixel comprises:
a third transistor connected to the (i+1)-th gate line and the j-th data line; and
a first low pixel electrode connected to the third transistor, and
the second low pixel comprises:
a fourth transistor connected to the (i+1)-th gate line and the (j+1)-th data line; and
a second low pixel electrode connected to the fourth transistor,
wherein
the first high pixel electrode, the first low pixel electrode, the second high pixel electrode and the second low pixel electrode are arranged in the second direction.

10. The display device of claim 9, wherein the third and fourth transistors are disposed adjacent to each other.

11. The display device of claim 9, wherein the first and second transistors are disposed between the first high pixel electrode and the first low pixel electrode.

12. The display device of claim 11, wherein the first transistor comprises:
a first gate electrode branched from the i-th gate line;
a first source electrode branched from the j-th data line; and
a first drain electrode connected to the first high pixel electrode,
wherein the first drain electrode extends in the second direction via the first high pixel electrode and is connected to a first connection electrode branched from an upper end of the first high pixel electrode.

13. The display device of claim 12, wherein the first high pixel electrode comprises:

an edge portion having a rectangular frame shape;

a trunk portion disposed in the edge portion, having a cross shape, and connected to the edge portion; and a plurality of branch portions extending from the trunk portion in an oblique direction and connected to the edge portion, wherein the first drain electrode overlaps with a portion extending in the second direction of the trunk portion.

14. The display device of claim 11, wherein the second transistor comprises:

a second gate electrode branched from the i-th gate line;

a second source electrode branched from the (j+1)-th data line; and a second drain electrode connected to the second high pixel electrode, wherein the second drain electrode extends in the second direction via the first low pixel electrode and is connected to a second connection electrode branched from an upper end of the second high pixel electrode.

15. The display device of claim 14, wherein the first low pixel electrode comprises:

an edge portion having a rectangular frame shape;

a trunk portion disposed in the edge portion, having a cross shape, and connected to the edge portion; and a plurality of branch portions extending from the trunk portion in an oblique direction and connected to the edge portion, wherein the second drain electrode overlaps with a portion extending in the second direction of the trunk portion.

16. The display device of claim 9, wherein the third and fourth transistors are disposed between the second high pixel electrode and the second low pixel electrode.

17. The display device of claim 16, wherein the third transistor comprises:

a third gate electrode branched from the (i+1)-th gate line;

a third source electrode branched from the j-th data line; and a third drain electrode connected to the first low pixel electrode, wherein the third drain electrode extends in the second direction via the second high pixel electrode and is connected to a third connection electrode branched from a lower end of the first low pixel electrode.

18. The display device of claim 17, wherein the second high pixel electrode comprises:

an edge portion having a rectangular frame shape;

a trunk portion disposed in the edge portion, having a cross shape, and connected to the edge portion; and a plurality of branch portions extending from the trunk portion in an oblique direction and connected to the edge portion, wherein the third drain electrode overlaps with a portion extending in the second direction of the trunk portion.

19. The display device of claim 16, wherein the fourth transistor comprises:

a fourth gate electrode branched from the (i+1)-th gate line;

a fourth source electrode branched from the (j+1)-th data line; and a fourth drain electrode connected to the second low pixel electrode, wherein the fourth drain electrode extends in the second direction via the second low pixel electrode and is connected to a fourth connection electrode branched from a lower end of the second low pixel electrode.

20. The display device of claim 19, wherein the second low pixel electrode comprises:

an edge portion having a rectangular frame shape;

a trunk portion disposed in the edge portion, having a cross shape, and connected to the edge portion; and a plurality of branch portions extending from the trunk portion in an oblique direction and connected to the edge portion, wherein the fourth drain electrode overlaps with a portion extending in the second direction of the trunk portion.

* * * * *